United States Patent
Ouyang (10) Patent No.: US 6,765,504 B2
(45) Date of Patent: Jul. 20, 2004

(54) CHINESE LANGUAGE PINYIN INPUT METHOD AND DEVICE BY NUMERIC KEY PAD

(75) Inventor: Yen-I Ouyang, Chung Ho (TW)

(73) Assignee: Matsushita Electric Industrial Co., Ltd., Osaka (JP)

( * ) Notice: Subject to any disclaimer, the term of this patent is extended or adjusted under 35 U.S.C. 154(b) by 295 days.

(21) Appl. No.: 09/889,555

(22) PCT Filed: Dec. 8, 2000

(86) PCT No.: PCT/JP00/08688

§ 371 (c)(1),
(2), (4) Date: Aug. 21, 2001

(87) PCT Pub. No.: WO01/42897

PCT Pub. Date: Jun. 14, 2001

(65) Prior Publication Data

US 2002/0158779 A1 Oct. 31, 2002

(30) Foreign Application Priority Data

Dec. 8, 1999 (JP) .......................... 11-348610

(51) Int. Cl.[7] .............................. H03K 17/94
(52) U.S. Cl. .................... 341/28; 345/171; 345/703; 400/110; 715/535; 341/23
(58) Field of Search ................ 341/28, 23, 20; 345/703, 171; 379/433.06, 433.07, 88.05, 368; 400/484, 110; 715/535

(56) References Cited

U.S. PATENT DOCUMENTS 4,679,951 A * 7/1987 King et al. ............... 400/110
5,945,928 A * 8/1999 Kushler et al. ............ 341/28
6,005,498 A * 12/1999 Yang et al. ................ 341/23
6,172,625 B1 * 1/2001 Jin et al. .................. 341/67
6,362,752 B1 * 3/2002 Guo et al. ................. 341/28
6,525,676 B2 * 2/2003 Kisaichi et al. ............ 341/22

FOREIGN PATENT DOCUMENTS

| CN | 287340 | 8/1985 |
|---|---|---|
| CN | 73890 | 1/1986 |
| JP | 2-126361 | 5/1990 |
| JP | 2-126362 | 5/1990 |

OTHER PUBLICATIONS

English Language Abstract of JP 2–126361.
English Language Abstract of JP 2–126362.
English Language Abstract of 287340.
English Language Abstract of 73890.

* cited by examiner

*Primary Examiner*—Albert K. Wong
(74) *Attorney, Agent, or Firm*—Greenblum & Bernstein, P.L.C.

(57) ABSTRACT

To enable Chinese characters to be inputted by means of pinyin symbols inputted with the use of nine numerical keys such as those used in a telephone set or a television remote controller.

For inputting pinyin symbols, keys "2" to "9" on a keypad are utilized and a conversion key is allocated, so that pinyin symbol combinations inputted are converted into a Chinese character or word. Because of this, difficulty in learning is reduced and the number of keystrokes is also reduced.

2 Claims, 8 Drawing Sheets

| PINYIN SYMBOL COMBINATION | CORRESPONDING KEY SIGNAL | ACTUAL KEY SIGNAL | PINYIN SYMBOL COMBINATION | CORRESPONDING KEY SIGNAL | ACTUAL KEY SIGNAL | PINYIN SYMBOL COMBINATION | CORRESPONDING KEY SIGNAL | ACTUAL KEY SIGNAL |
|---|---|---|---|---|---|---|---|---|
| a | 2 | 20 | cun | 286 | 2861 | gong | 4664 | 46640 |
| ba | 22 | 220 | e | 3 | 30 | hong | 4664 | 46641 |
| ca | 22 | 221 | fa | 32 | 320 | gou | 468 | 4680 |
| bai | 224 | 2240 | da | 32 | 321 | hou | 468 | 4681 |
| cai | 224 | 2241 | dai | 324 | 324 | gu | 48 | 480 |
| bao | 226 | 2260 | fan | 326 | 3260 | hu | 48 | 481 |
| ban | 226 | 2261 | dao | 326 | 3261 | gua | 482 | 4820 |
| cao | 226 | 2262 | dan | 326 | 3262 | hua | 482 | 4821 |
| can | 226 | 2263 | fang | 3264 | 32640 | guai | 4824 | 48240 |
| bang | 2264 | 22640 | dang | 3264 | 32641 | huai | 4824 | 48241 |
| cang | 2264 | 22641 | de | 33 | 330 | guan | 4826 | 48260 |
| ce | 23 | 230 | fei | 334 | 3340 | huan | 4826 | 48261 |
| bei | 234 | 234 | dei | 334 | 3341 | guang | 48264 | 482640 |
| ben | 236 | 2360 | fen | 336 | 3360 | huang | 48264 | 482641 |
| cen | 236 | 2361 | feng | 3364 | 33640 | gui | 484 | 4840 |
| beng | 2364 | 23640 | deng | 3364 | 33641 | hui | 484 | 4841 |
| ceng | 2364 | 23641 | di | 34 | 340 | guo | 486 | 4860 |
| bi | 24 | 240 | ei | 34 | 341 | gun | 486 | 4861 |
| ci | 24 | 241 | dia | 342 | 3420 | huo | 486 | 4862 |
| ai | 24 | 2420 | diao | 3426 | 34260 | hun | 486 | 4863 |
| cha | 242 | 2421 | dian | 3426 | 34261 | la | 52 | 520 |
| chai | 2424 | 2424 | diang | 34264 | 34264 | ka | 52 | 521 |
| biao | 2426 | 24260 | die | 343 | 343 | lai | 524 | 5240 |
| bian | 2426 | 24261 | ding | 3464 | 3464 | kai | 524 | 5241 |
| chao | 2426 | 24262 | diu | 348 | 348 | lao | 526 | 5260 |
| chan | 2426 | 24263 | fo | 36 | 360 | lan | 526 | 5261 |
| chang | 24264 | 24264 | en | 36 | 361 | kao | 526 | 5262 |
| bie | 243 | 2430 | dong | 3664 | 3664 | kan | 526 | 5263 |
| che | 243 | 2431 | fou | 368 | 3680 | lang | 5264 | 52640 |
| chen | 2436 | 24360 | dou | 368 | 3681 | kang | 5264 | 52641 |
| cheng | 24364 | 24364 | er | 37 | 37 | le | 53 | 530 |
| chi | 244 | 244 | fu | 38 | 380 | ke | 53 | 531 |
| bin | 246 | 2460 | du | 38 | 381 | lei | 534 | 534 |
| bing | 2464 | 2464 | duan | 3826 | 3826 | ken | 536 | 5360 |
| chong | 24664 | 24664 | dui | 384 | 384 | leng | 5364 | 53640 |
| chou | 2468 | 2468 | duo | 386 | 3860 | keng | 5364 | 53641 |
| chu | 248 | 2480 | dun | 386 | 3861 | li | 54 | 540 |
| chua | 2482 | 24820 | ga | 42 | 420 | ji | 54 | 541 |
| chuai | 24824 | 24824 | ha | 42 | 421 | lia | 542 | 5420 |
| chuan | 24826 | 248260 | gai | 424 | 4240 | jia | 542 | 5421 |
| chuang | 248264 | 248264 | hai | 424 | 4241 | liao | 5426 | 54260 |
| chui | 2484 | 2484 | gao | 426 | 4260 | lian | 5426 | 54261 |
| chuo | 2486 | 24860 | gan | 426 | 4261 | jiao | 5426 | 54262 |
| chun | 2486 | 24861 | hao | 426 | 4262 | jian | 5426 | 54263 |
| bo | 26 | 260 | han | 426 | 4263 | liang | 54264 | 542640 |
| ao | 26 | 261 | gang | 4264 | 42640 | jiang | 54264 | 542641 |
| an | 26 | 262 | hang | 4264 | 42641 | lie | 543 | 5430 |
| ang | 264 | 264 | ge | 43 | 430 | jie | 543 | 5431 |
| cong | 2664 | 2664 | he | 43 | 431 | lin | 546 | 5460 |
| cou | 268 | 268 | gei | 434 | 4340 | jin | 546 | 5461 |
| bu | 28 | 280 | hei | 434 | 4341 | ling | 5464 | 54640 |
| cu | 28 | 281 | gen | 436 | 4360 | jing | 5464 | 54641 |
| cuan | 2826 | 2826 | hen | 436 | 4361 | jiong | 54664 | 54664 |
| cui | 284 | 284 | geng | 4364 | 43640 | liu | 548 | 5480 |
| cuo | 286 | 2860 | heng | 4364 | 43641 | jiu | 548 | 5481 |

Fig. 6

| PINYIN SYMBOL COMBINATION | CORRESPONDING KEY SIGNAL | ACTUAL KEY SIGNAL | PINYIN SYMBOL COMBINATION | CORRESPONDING KEY SIGNAL | ACTUAL KEY SIGNAL |
|---|---|---|---|---|---|
| tuan | 8826 | 8826 | zhuang | 948264 | 948264 |
| tui | 884 | 884 | zhui | 9484 | 9484 |
| tuo | 886 | 8860 | zhuo | 9486 | 94860 |
| tun | 886 | 8861 | zhun | 9486 | 94861 |
| za | 92 | 920 | yo | 96 | 960 |
| ya | 92 | 921 | wo | 96 | 961 |
| wa | 92 | 922 | zong | 9664 | 96640 |
| zai | 924 | 9240 | yong | 9664 | 96641 |
| yai | 924 | 9241 | zou | 968 | 9680 |
| wai | 924 | 9242 | you | 968 | 9681 |
| zao | 926 | 9260 | xu | 98 | 980 |
| zan | 926 | 9261 | zu | 98 | 981 |
| yao | 926 | 9262 | wu | 98 | 9820 |
| yan | 926 | 9263 | yu | 98 | 9830 |
| wan | 926 | 92640 | xuan | 9826 | 98260 |
| zang | 9264 | 92641 | zuan | 9826 | 98261 |
| yang | 9264 | 92642 | yuan | 9826 | 98262 |
| wang | 9264 | 92643 | xue | 983 | 9831 |
| ze | 93 | 930 | yue | 983 | 9832 |
| ye | 93 | 931 | zui | 984 | 984 |
| zei | 934 | 9340 | xun | 986 | 9860 |
| wei | 934 | 9341 | zuo | 986 | 9861 |
| zen | 936 | 9360 | zun | 986 | 9862 |
| wen | 936 | 9361 | yun | 986 | 9863 |
| zeng | 9364 | 93640 | | | |
| weng | 9364 | 93641 | | | |
| xi | 94 | 940 | | | |
| zi | 94 | 941 | | | |
| yi | 94 | 9420 | | | |
| xia | 942 | 9421 | | | |
| zha | 942 | 9422 | | | |
| zhai | 9424 | 9424 | | | |
| xiao | 9426 | 94260 | | | |
| xian | 9426 | 94261 | | | |
| zhao | 9426 | 94262 | | | |
| zhan | 9426 | 94263 | | | |
| xiang | 94264 | 942640 | | | |
| zhang | 94264 | 942641 | | | |
| xie | 943 | 9430 | | | |
| zhe | 943 | 9431 | | | |
| zhen | 9436 | 94360 | | | |
| zheng | 94364 | 94364 | | | |
| zhi | 944 | 944 | | | |
| xin | 946 | 9460 | | | |
| yin | 946 | 9461 | | | |
| xing | 9464 | 94640 | | | |
| ying | 9464 | 94641 | | | |
| xiong | 94664 | 946640 | | | |
| zhong | 94664 | 946641 | | | |
| zhou | 9468 | 9468 | | | |
| xiu | 948 | 9480 | | | |
| zhu | 948 | 9481 | | | |
| zhua | 9482 | 94820 | | | |
| zhuai | 94824 | 94824 | | | |
| zhuan | 94826 | 948260 | | | |

Fig. 7

| NUMERICAL KEYPAD | DISPLAY PATION | |
|---|---|---|
| INPUTTED KEY STROKE | INCOMPLETE REGION | CONVERTED REGION |
| 9 | w  x  y  z | |
| 94 | xi  yi  zi | |
| 946 | xin  yin | |
| 9466 | xion  zhon | |
| 94664 | xiong  zhong | |
| 946641 | | 終 |
| 9466414 | g  h  i | 終 |
| 94664148 | gu  hu | 終 |
| 946641486 | guo  gun  huo  hun | 終 |
| 9466414860 | | 中國 |
| 94664148607 | p  q  r  s | 中國 |
| 946641486073 | re  se | 中國 |
| 9466414860736 | pen  ren  sen | 中國 |
| 94664148607361 | | 中國人 |

Fig. 8

| INPUTTED KEY STROKE / TIMES | 1 | 2 | 3 | 4 |
|---|---|---|---|---|
| 2 | a | b | c | |
| 3 | d | e | f | |
| 4 | g | h | i | |
| 5 | j | k | l | |
| 6 | m | n | o | |
| 7 | p | q | r | s |
| 8 | t | u | v | |
| 9 | w | x | y | z |
| # | CONVERSION | | | |

Fig. 9

| INPUTTED KEY STROKE / CODED NUMBER | 1 | 2 | 3 | 4 | 5 |
|---|---|---|---|---|---|
| 1 | i | b | p | m | f |
| 2 | er | d | t | n- | l |
| 3 | s(z)- | an | g- | k | h- |
| 4 | j-(i) | ch-(i) | sh-(i) | iu | i(u)-e |
| 5 | j(r) | ch(r) | sh(r) | r- | u |
| 6 | ts(z) | ai | tz | ou | au |
| 7 | -(e)ng | -(e)n | ang | -o | -e |
| 8 | -a | ei | | | |

CHINESE LANGUAGE PINYIN INPUT METHOD AND DEVICE BY NUMERIC KEY PAD

BACKGROUND OF THE INVENTION

1. Field of the Invention

This invention relates to a Chinese pinyin input method and apparatus that utilize the nine numerical keys of a numerical keypad of a telephone set or a remote controller of a television set to enable the user to input Chinese characters.

2. Description of the Related Art

In present life, applications of electronic information have become more and more broader. The need to utilize keyboards on non-computer devices to input Chinese characters, such as keypads on electronic calculators, mobile phones, and TV remote controllers, has become more and more intense. If such devices are to be provided with certain functions, such as phone directory, memorandum, E-mail transmission and reception, short message display, and the like, these devices must possess a facility for inputting characters. With the feature of inputting Chinese characters, such devices can not only increase their added value but also broaden the field of their applications.

Presently, people in Mainland China and westerners use the Romanization pinyin method as a standard for pronouncing Chinese characters. As such, the pinyin method is practical for use as a Chinese character input method.

Currently, some devices, such as telephone sets or numerical keypads, provided with a Chinese character input function have been proposed, e.g., the "telephone keypad" of R.O.C. Patent Publication No. 287340. The object of this patent is, in order to enhance memorization of a phone number, the numerical keys of a telephone set correspond with characters of a language or phonetic symbols, and these characters are used to represent the phone number. In case of applying to Chinese, the 37 Chinese phonetic symbols are transformed into 37 sets of Chinese Pinyin units. Among them, 24 sets are chosen for assignment to the numerical keys "2" to "9" of the telephone set.

Although the invention can be applied to the input of Chinese characters via the pinyin method, because the keypad arrangement is made according to the arrangement of the Chinese phonetic symbols, which is not harmonized with the positions of the English letters on the keypad of the telephone set, using the pinyin method to input Chinese characters would complicate the keypad and make it difficult to learn. Besides, since all 37 sets of pinyin units are not included, the goal of completely inputting all Chinese characters cannot be achieved. If the remaining 13 sets are to be arranged into the keys, the keypad would become more complicated to operate, and would require too many input keystrokes.

Figure 8:
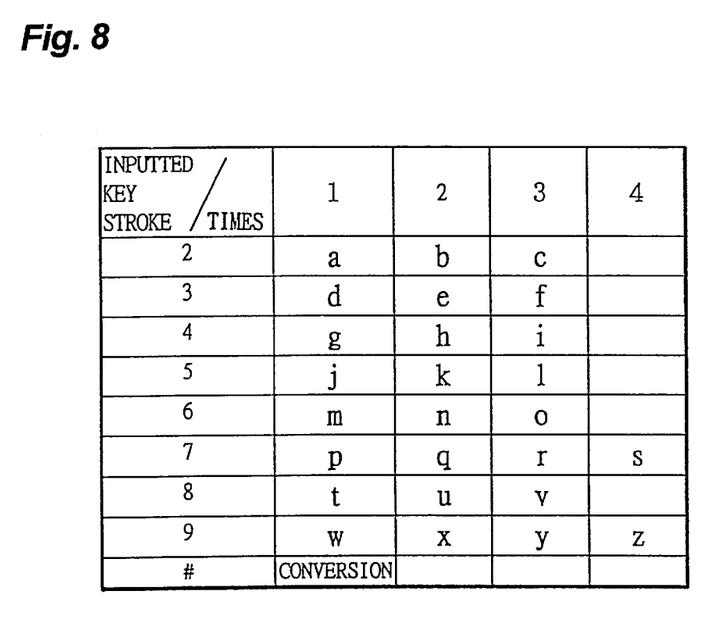
FIG. 8 illustrates how keys and phonetic symbols are matched in a conventional manner.

Besides, there are several prototype products in the industry, which utilize direct methods for inputting pinyin units. Particularly, the original arrangement of the English letters on the numerical keypad of the general telephone set, and the number of keystrokes of a particular key are utilized for directly inputting pinyin units, as shown in FIG. 8. For example, when "j" is to be inputted, key "5" is pressed once and, when "k" is to be inputted, key "5" is pressed twice. While such a technique is easy to learn, it requires too many keystrokes for input. For example, when the Chinese character "中("zhong")" is to be inputted, up to a total of 13 keystrokes (key "9", 4 times; key "4", 2 times; key "6", 3 times; key "6", 2 times; key "4", 1 time; and conversion key, 1 time) is required for input. There are 409 valid pinyin combinations (excluding the Chinese phonetic tones) in the Chinese language, each of which requires 7.76 keystrokes on an average.

Figure 9:
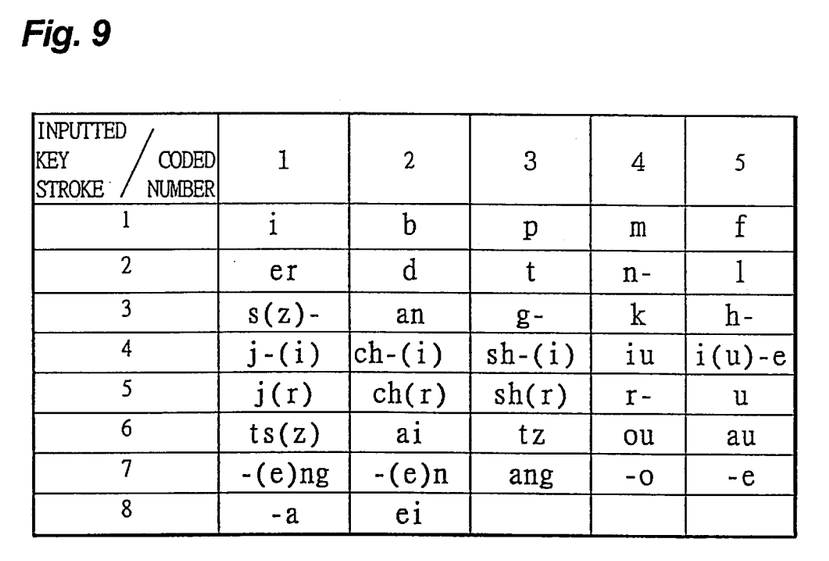
FIG. 9 illustrates how keys and phonetic symbols are matched in another conventional manner.

The input method of R.O.C. Patent Publication No. 73890, for example, is related to the use of Romanization pinyin for inputting Chinese characters via numerical keys. The key arrangement is shown in FIG. 9. In this method, each Chinese Phonetic symbol corresponds to a set of pinyin symbols. These pinyin symbols are then arranged into the numerical keys "1" to "8," and are subsequently coded according to the key arrangement. For example, the code for "b" is 12 (the second symbol for key "1"), for "sh" is 53 (the third symbol for key "5"), and for "o" is 74 (the fourth symbol for key "7"). The second, third, fourth and light Chinese phonetic tones are represented respectively by the numerical keys "2", "3", "4" and "5". During input, the key input codes and the Chinese phonetic tone keys form a Chinese phonetic sound combination.

For example, the combinations "mien2" "guo2" represents the Chinese characters "民""國", which are coded as:

mien2: 1411722 guo2: 3355742

In this input method, two keys are required to be pressed for each set of the pinyin symbols that corresponds to a Chinese phonetic symbol, and an additional Chinese phonetic tone key to complete a pinyin symbol combination that is subsequently transformed into a Chinese character.

Although this method requires a fewer number of keystrokes than the input method shown in FIG. 8, the average number of keystrokes needed for inputting each combination is 5.7 keys, which is still too many. While this method processes pinyin combinations having the Chinese phonetic tones, it can also be suitably used for pinyin combinations having no Chinese phonetic tones by simply replacing all of the Chinese phonetic tone keys with a single conversion key. The average number of the keystrokes needed for inputting each pinyin combination for pinyin processing without the Chinese phonetic tones is 4.7. This method has a disadvantage in that the way Chinese phonetics correspond to pinyin gives the user a feeling of confusion and inability to respond directly.

Moreover, the two keys required for inputting each pinyin symbol are normally two different keys, and not the same key pressed twice, thereby slowing down the input speed. Furthermore, the keystroke arrangement of the pinyin symbols is confusing, and the user is unable to directly understand the keystroke codes, thus further increasing the learning difficulty.

DISCLOSURE OF THE INVENTION

Technical Problems to be Solved by the Invention

The methods of the prior art described above have the following disadvantages:

1. The coded arrangement of the keystrokes for the pinyin symbols is different from the arrangement of the English letters on the numerical keypad of the general telephone set, thereby resulting in confusion and difficulty in memorizing as well as in learning, and making it inconvenient to use.

2. The average number of input keystrokes is too many, which also prolongs the input data time.

The present invention is intended to provide an easy and convenient Chinese input method and apparatus that uses the numerical keypad provided on devices, such as a telephone set or a remote controller of a television set, with a limited number of keys.

Solving Method

In order to substantially eliminate the disadvantages described above, a Chinese pinyin input method according to this invention uses a numerical keypad and is implemented by a device, which has a numerical keypad, a memory portion and a display portion, for inputting Chinese characters. The method comprises the following steps:

Step 1: arranging pinyin symbols according to the arrangement of the English letters on the numerical keypad of a general telephone set, assigning one of the keys, excluding the keys "2" to "9", as a conversion key, and constructing a key and pinyin symbol combination look-up portion in the memory portion for storing keypad key signal combinations and corresponding pinyin symbol combinations in accordance with the keypad arrangement;

Step 2: constructing a dictionary in the memory portion for storing the Pinyin symbol combinations and corresponding Chinese characters or words;

Step 3: based on the aforesaid look-up rules for keys and pinyin symbols, inputting a key signal by pressing a key probably followed by additional conversion selection keys from the numerical keypad according to the desired pinyin symbol;

Step 4: according to the key signal inputted by the user, combining the inputted key signal with previous inputted keystroke signals yet to be converted into a Chinese character, and retrieving the corresponding pinyin symbol combination from the key and pinyin symbol combination look-up portion;

Step 5: analyzing the corresponding pinyin symbol combination, repeating Step 3 if there exists a plurality of combinations for continued input by the user, otherwise, comparing the pinyin symbol combination together with a string of pinyin symbols inputted beforehand with the dictionary to retrieve the corresponding Chinese character or word, and transmitting the corresponding Chinese character or word to the display portion for output display; and Step 6: unless terminated by the user, repeating Step 3 to continue with input of a next Chinese character.

Moreover, according to this invention, a Chinese Pinyin input apparatus for inputting Chinese characters uses numerical keypad having a numerical keypad, a memory portion, and a display portion. The apparatus comprises.

a key and pinyin symbol combination look-up portion constructed in the memory portion for storing keypad key signal combinations and corresponding pinyin symbol combinations in accordance with a keypad arrangement in which the pinyin symbols are arranged according to the arrangement of the English letters on the numerical keypad of a general telephone set, and in which one of the keys, excluding the keys "2" to "9", is assigned as a conversion key;

a dictionary for storing the pinyin symbol combinations and corresponding Chinese characters or words;

a Chinese word converting portion for converting pinyin symbols into the corresponding Chinese character of word by using valid pinyin symbol combinations as indexing keys for comparison with the dictionary; and a system control portion for controlling and analyzing the inputted key signals, for executing the conversion of the key signal combinations to the pinyin symbol combinations, the conversion of the pinyin symbol combinations to the Chinese characters or word, and for managing the output of data.

This invention is based on the arrangement of the English letters on the numerical keypad of a general telephone set to setup pinyin symbol keys. Thus, the use can easily adapt to the keypad input method without further practice. Also, this invention only requires one operation for a key when inputting each pinyin symbol, thereby decreasing the number of input keystrokes. For example, if the user wishes to input any one of "a", "b", or "c," the user only needs to press the key "2" once. Thereafter, the operation for inputting the next pinyin symbol can proceed. After the input of all of the pinyin symbols has been completed, the pinyin symbol combination inputted by the user is identified based on data in a key and pinyin symbol combination look-up portion. By utilizing such a key input method, together with key and pinyin symbol identification techniques, it is possible to lower the average input keystroke number to 4.1 for each of the 409 valid pinyin symbol combinations. This result is close to the average keystroke number for inputting Chinese characters using a computer keyboard.

With the aforesaid pinyin input method that does not require learning, together with the function of converting pinyin symbols to Chinese characters or word, it is possible for the user to achieve the goal of fast and convenient input of Chinese characters using a numerical keypad.

BRIEF DESCRIPTION OF THE DRAWINGS

FIGS. 5 and 6 illustrate a look-up table for valid pinyin symbol combinations, corresponding key signal combinations, and actual key signal combinations of the embodiment of this invention;

BEST MODE FOR CARRYING OUT THE INVENTION

Figure 4:
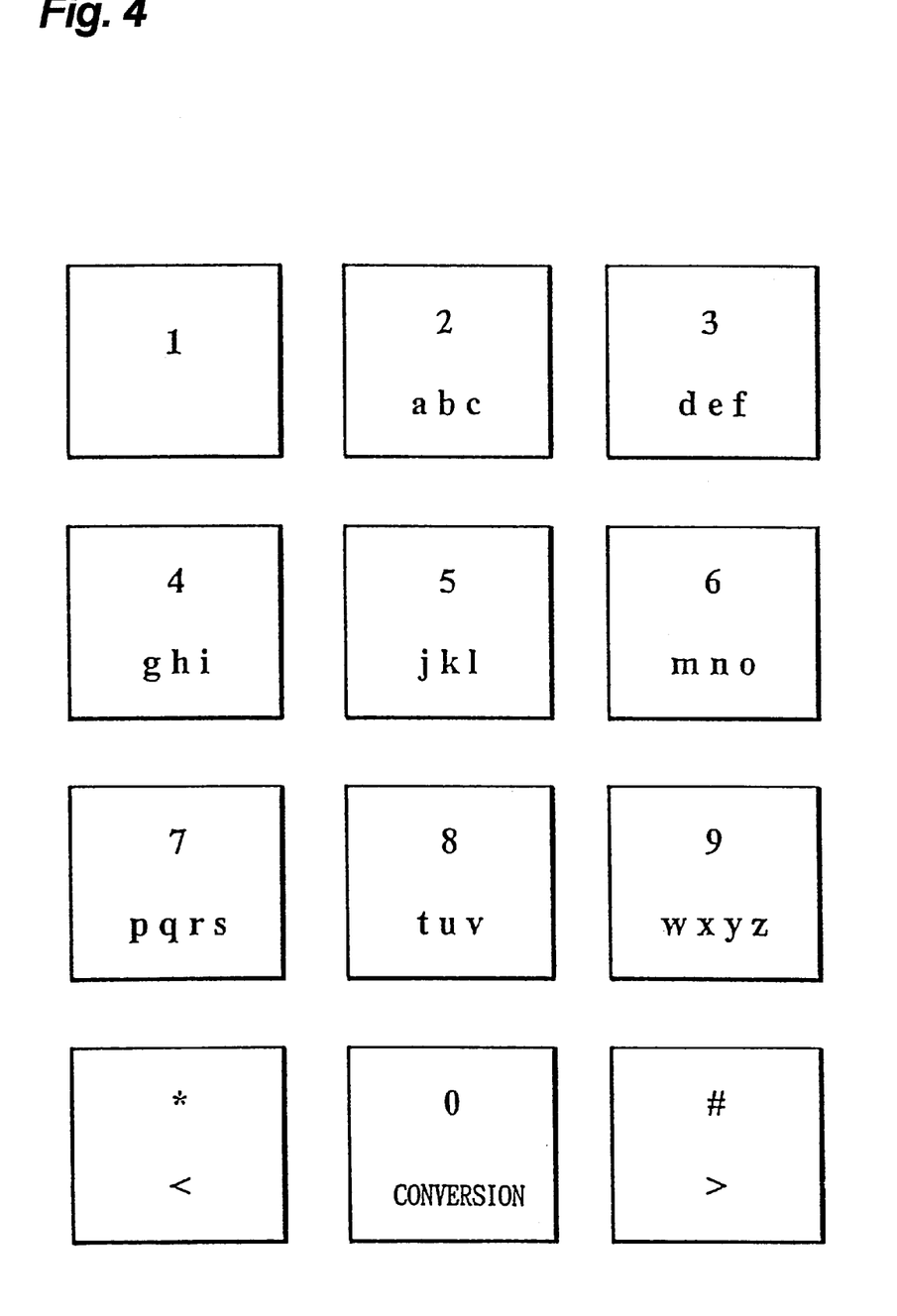
FIG. 4 illustrates an arrangement of phonetic symbols on numerical keys according to this invention.

FIG. 4, illustrates an arrangement of pinyin symbols on numerical keys according to this invention. It can be seen from FIG. 4 that the 26 pinyin symbols are arranged, according to the arrangement of the English letters on the numerical keypad of the general telephone set, on keys "2" to "9". In addition, key "0" is used as a conversion key. If the user wishes to input a pinyin symbol, the key corresponding to the pinyin symbol is pressed only once. For example, if it is desired to input "t", the corresponding key "8" is pressed once. If it is desired to input "i", the corresponding key "4" is pressed once. The conversion key is pressed only after all the pinyin symbols for a Chinese character have been inputted.

If direct conversion to a corresponding Chinese character does not occur, this means that the pinyin symbol combination can further receive another pinyin symbol to form another Chinese character. At this time, the conversion key can be pressed to force conversion into the Chinese character. For example, if the user wishes to input "bin"(賓), after key "2" is pressed once, key "4" is pressed once, and key "6" is pressed once, even though the inputted keys "246" can match "bin" according to data in the key and pinyin symbol combination look-up portion, if key "4" is subsequently pressed, the match would be for "bing"(冰). Therefore, at this time, the conversion key "0" has to be pressed to indicate the end of a single Chinese character pinyin so that "246", which corresponds to "bin", can be converted to "賓" After the user inputs "2464", because further input of any key will not arise in other combinations, "2464", which corresponds to "bing", will be converted directly to "冰" without the need to press the conversion key.

Besides, it is possible for a key signal combination to match with a plurality of pinyin symbol combinations. For example, the key signal combination "736" corresponds to three sets of pinyin symbol combinations, i.e. "pen", "ren", and "sen". In such a case, it cannot be determined which is the desired pinyin symbol combination inputted by the user. To solve this problem, an additional key signal is added, i.e., the first set is added with the conversion key "0", the second set is added with the key "1", the third set is added with the key "2", and so on.

If another problem occurs due to the input of an additional key, this can be solved by further inputting another key. Therefore, according to the example described above, the actual key signal combination for "ben" is "7360", for "ren" is "7361", and for "sen" is "7362". During actual, operation, after the user has inputted "736", the display portion will display the three possible corresponding combinations "pen", "ren", and "sen". At this time, if the user wishes to input "pen," only key "0" is needed to be inputted once. If the user wishes to input "ren", only key "1" is needed to be inputted once. If the user wishes to input "sen", only "2" is needed to be inputted once. Therefore, the processing method of adding a key is associated with a selecting action, and will not result in increased burden on the user's memory.

FIG. 5 illustrates a look-up table of the 409 valid pinyin symbol combinations and their corresponding key signal combinations and the actual key signal combinations. These date are the ones stored in the key and pinyin symbol combination look-up portion.

Figure 1:
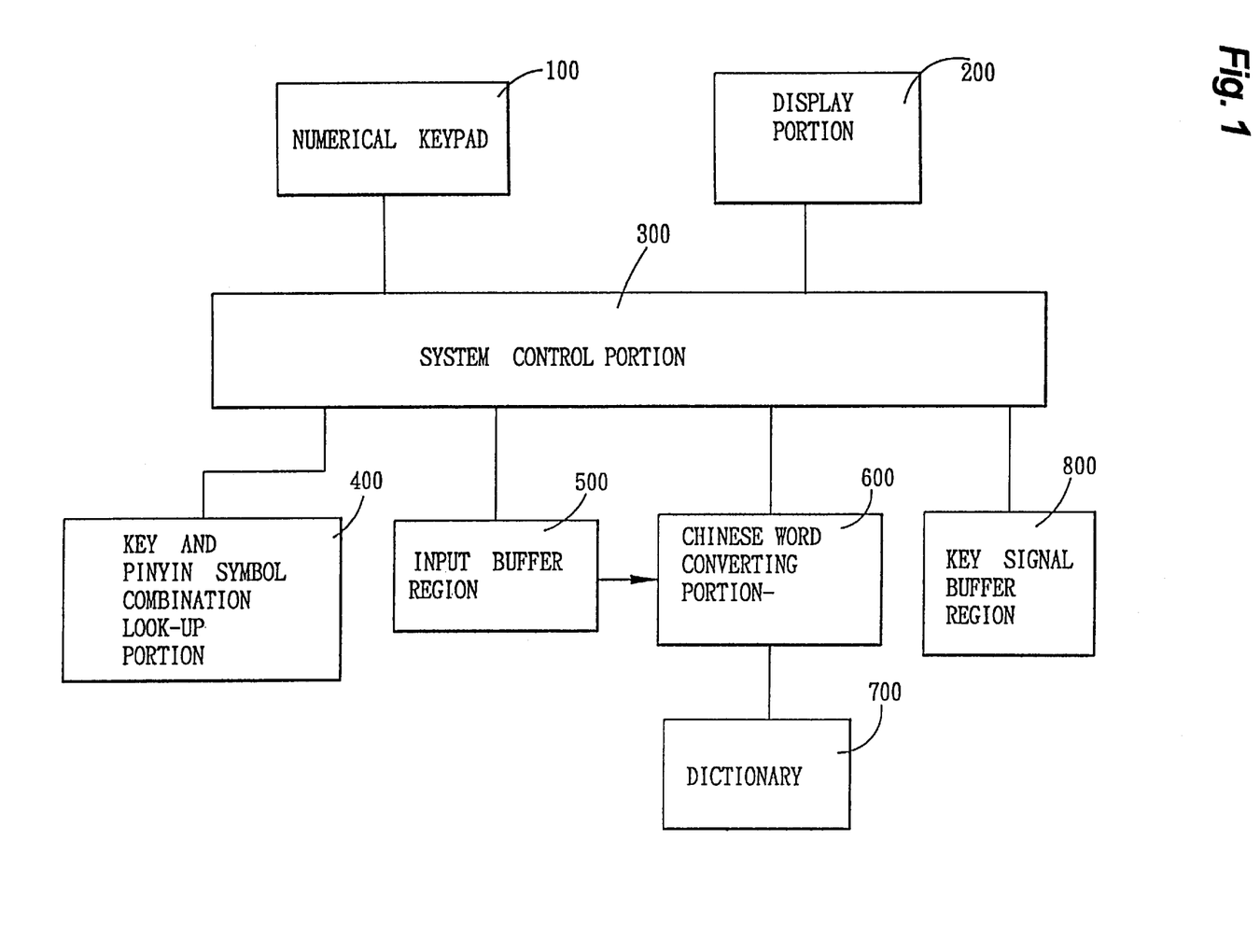
FIG. 1 is a system block diagram of an embodiment of this invention.

FIG. 1 shows a system block diagram of an embodiment of this invention. As shown in FIG. 1, the user presses a key on the numerical keypad 100, and the key signal is then transmitted to a system control portion 300. Upon receiving the key signal, the system control portion 300 will combine the key signal with a previously inputted key signal stored in a key signal buffer region 800. Then, according to this key signal combination, a corresponding pinyin symbol combination is retrieved from the key and pinyin symbol combination look-up portion 400.

Afterwards, it is determined if the pinyin symbol combination should be converted into a Chinese character. If the answer is no, the key signal combination is stored in the key signal buffer region 800, and the key input operation is continued. If the answer is yes, the pinyin combination is added into an input buffer region 500, and a Chinese word converting portion 600 is informed to convert the pinyin symbol combination in the input buffer region 500 to a corresponding Chinese character or word with reference to a dictionary 700. The corresponding Chinese character or word is sent back to the system control portion 300, which then sends the same to the display portion as a response to the user.

Figure 2:
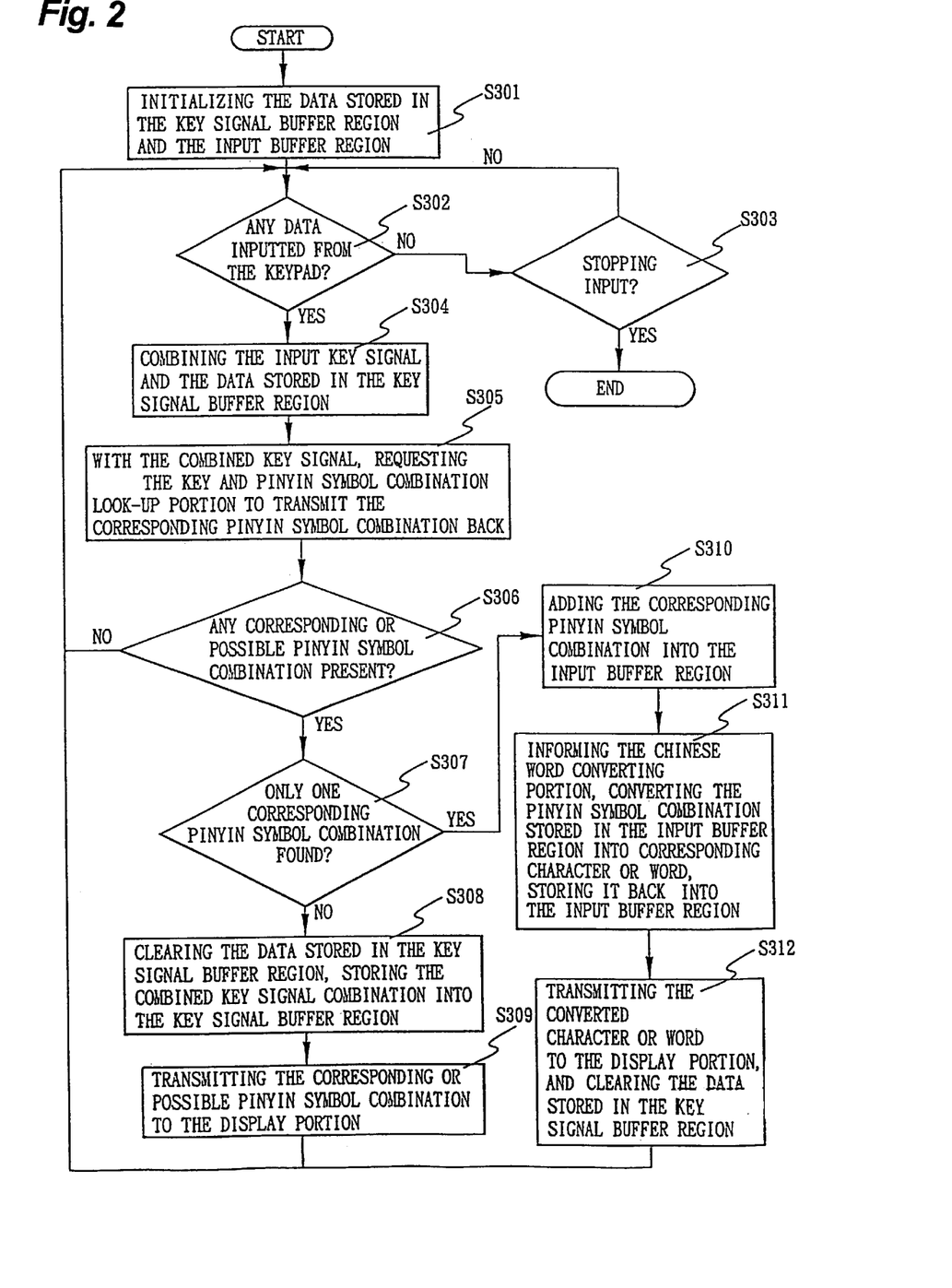
FIG. 2 is a flowchart illustrating the operation of a system control of the embodiment of this invention.

FIG. 2 is a flowchart illustrating the operation of the system control portion 300 of the embodiment of this invention. Upon entering Chinese character input processing, data of the key signal buffer region and the input buffer region are initialized in step S301. Next, it is determined whether date from the numerical keypad was transmitted in step S302. If the answer is no, the flow proceeds to step S303 to determine whether the user wishes to end the input of Chinese characters. If data was transmitted from the numerical keypad, the flow proceeds to step S304 to combine the input key signal with data in the key signal buffer region.

Next, in step S305, the key signal combination is employed to retrieve a corresponding or possible pinyin symbol combination from the key signal and pinyin symbol combination look-up portion. The so-called possible pinyin symbol combination indicates that the hitherto inputted pinyin symbol combination has yet to be completed but will be possibly completed in the future. For example, when the user inputs "9466", although no identical key signal combination can be found in the key and pinyin symbol combination look-up portion, the key signal combination "94664" is present. The sets of pinyin symbol combinations, i.e., "xiong" and "zhong", corresponding to the key signal combination "94664" will be retrieved. By eliminating the pinyin code corresponding to the last key signal "4", the corresponding pinyin symbol combinations will be "xion" and "zhon", which are the possible pinyin symbol combinations corresponding to the key signal combination "9466".

Thereafter, the flow proceeds to step S306 to determine whether a corresponding or possible pinyin symbol combination has been found. If the answer is no, indicating that the inputted key signal results in an invalid combination, and the flow returns to step S302 for continuously receiving an input. If there is a corresponding or possible pinyin symbol combination, the flow proceeds to step S307 to determine whether only one corresponding pinyin symbol combination was found. If the answer is no, indicating that the resulting key signal combination has not been completed for it to be converted into a corresponding Chinese character, the flow proceeds to step S308 for clearing the data in the key signal buffer region and for storing the key signal combination obtained in step S304 into the input buffer region.

Thereafter, in step S309, the corresponding or possible pinyin symbol combination is sent to the display portion as a response to the user. The flow then goes back to step S302 for continuing to receive an input. If it is determined in step s307 that only one corresponding pinyin symbol combination was found, indicating that the conversion to Chinese character can begin, the flow goes to step S310 for storing the corresponding pinyin symbol combination into the input buffer region.

Thereafter, step S311 is performed to inform the Chinese word converting portion to convert the pinyin symbol combination stored in the input buffer region into a corresponding character or word, and store the converted character or word into the input buffer region. Next, in step S312, the converted character or word is transmitted to the display portion as a response to the user, and the data in the key signal buffer region is cleared before returning back to step S302 for continuing to receive an input.

Figure 3:
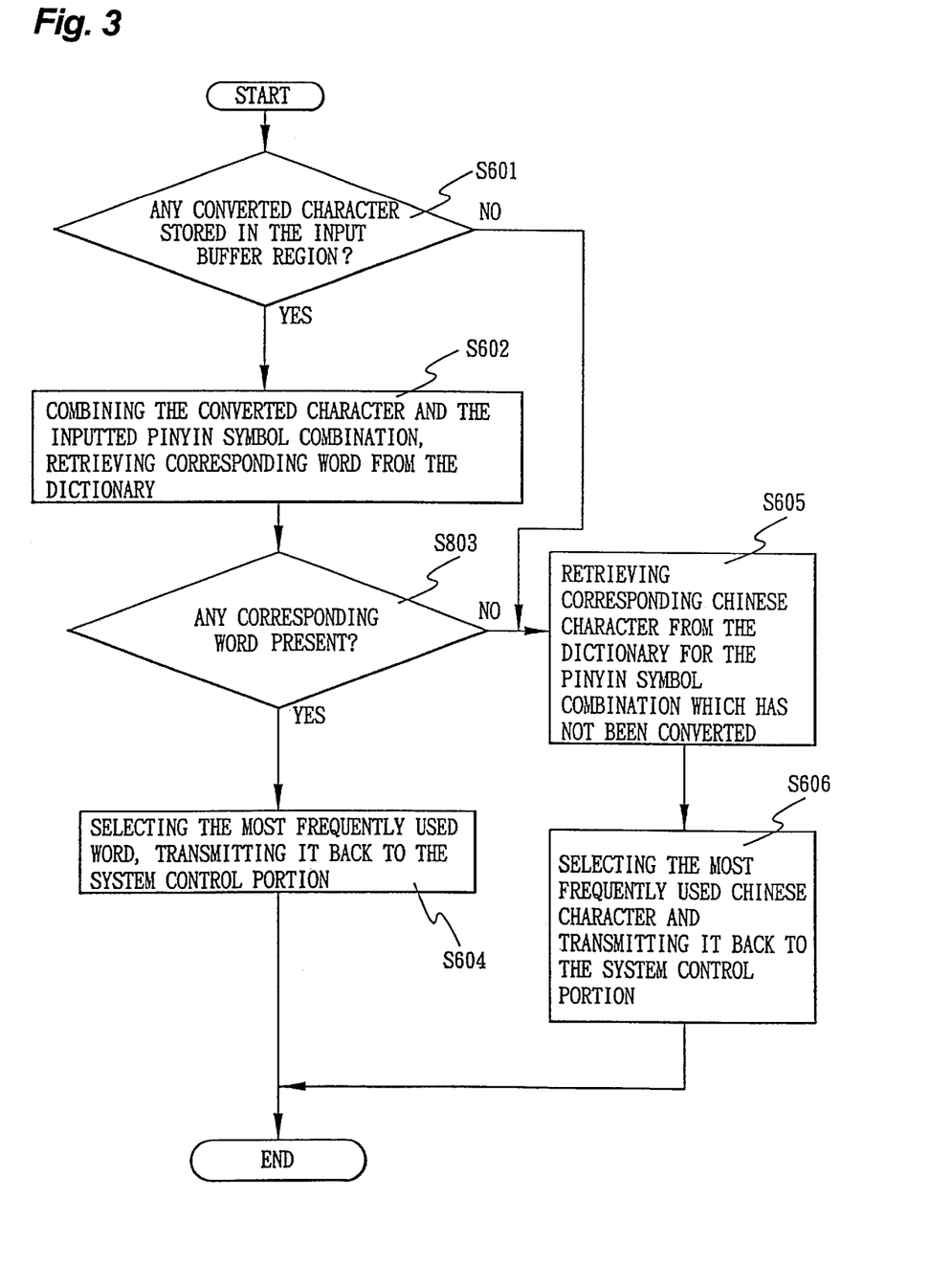
FIG. 3 is a flowchart illustrating the operation of a Chinese word converting portion of the embodiment of this invention.

FIG. 3 is a flowchart illustrating the operation of the Chinese word converting portion of the embodiment of this invention. When the system control portion informs the Chinese word converting portion of the need to convert a Chinese character or word, step S601 is performed to determine whether a converted Chinese character is present in the input buffer region. If the answer is yes, indicating that there is a possibility for the converted Chinese character to combine with the pinyin symbol combination which is to be converted to a character to form a word, the flow proceeds to step S602, where a corresponding Chinese word is retrieved from the dictionary via the combination of the converted Chinese character and the inputted pinyin symbol combination.

After that, in step S603, it is determined whether corresponding words were found. If the answer is yes, the flow goes to step S604 for selecting the most frequently used word from the candidate words, and for transmitting the same to the system control portion. If no corresponding word was found, step S605 is performed to retrieve the corresponding Chinese character for the pinyin symbol combination to be converted from the dictionary. In step S606, the most frequently used character from the candidate characters is determined and is transmitted to the system control portion. If it was determined in step S601 that there is no converted character stored in the input buffer region, the flow proceeds directly to step S705.

Figure 6:
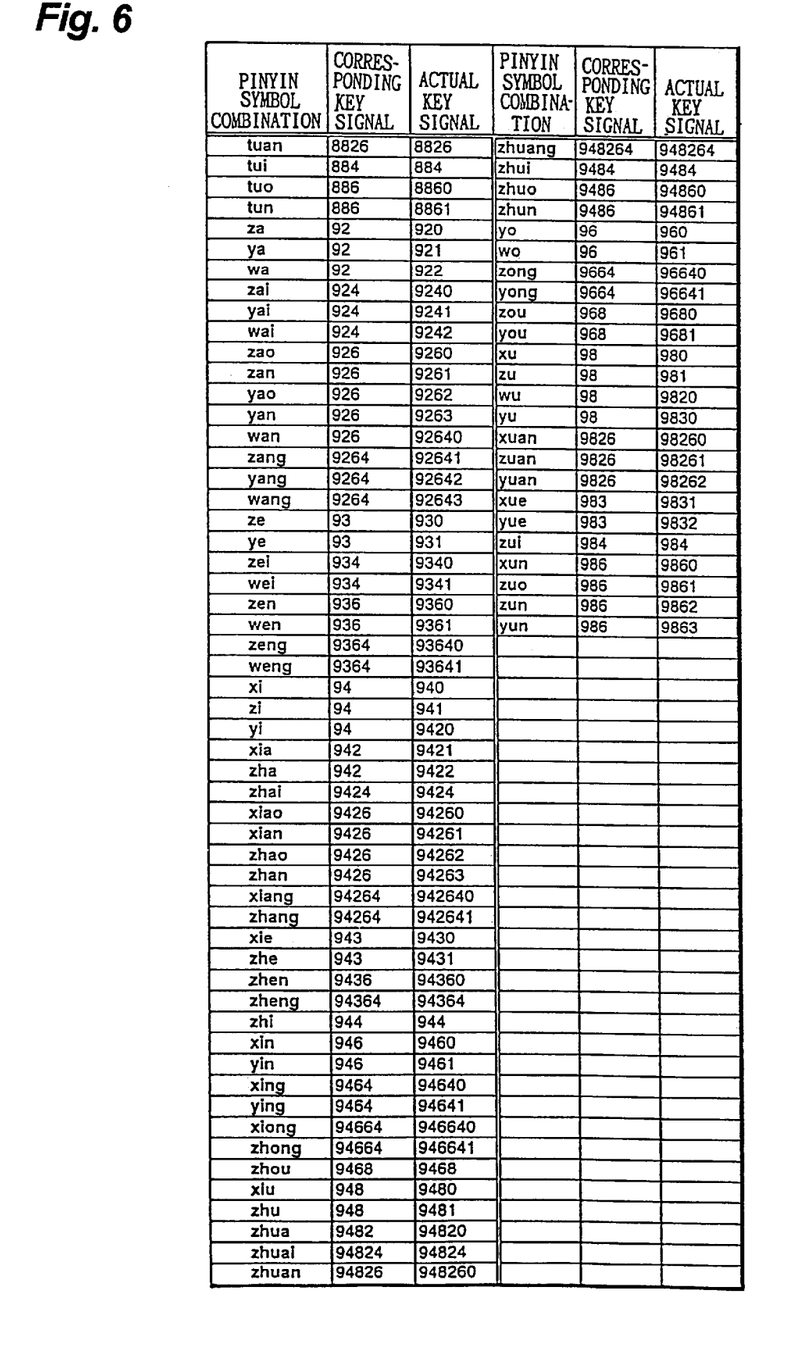
Figure 7:
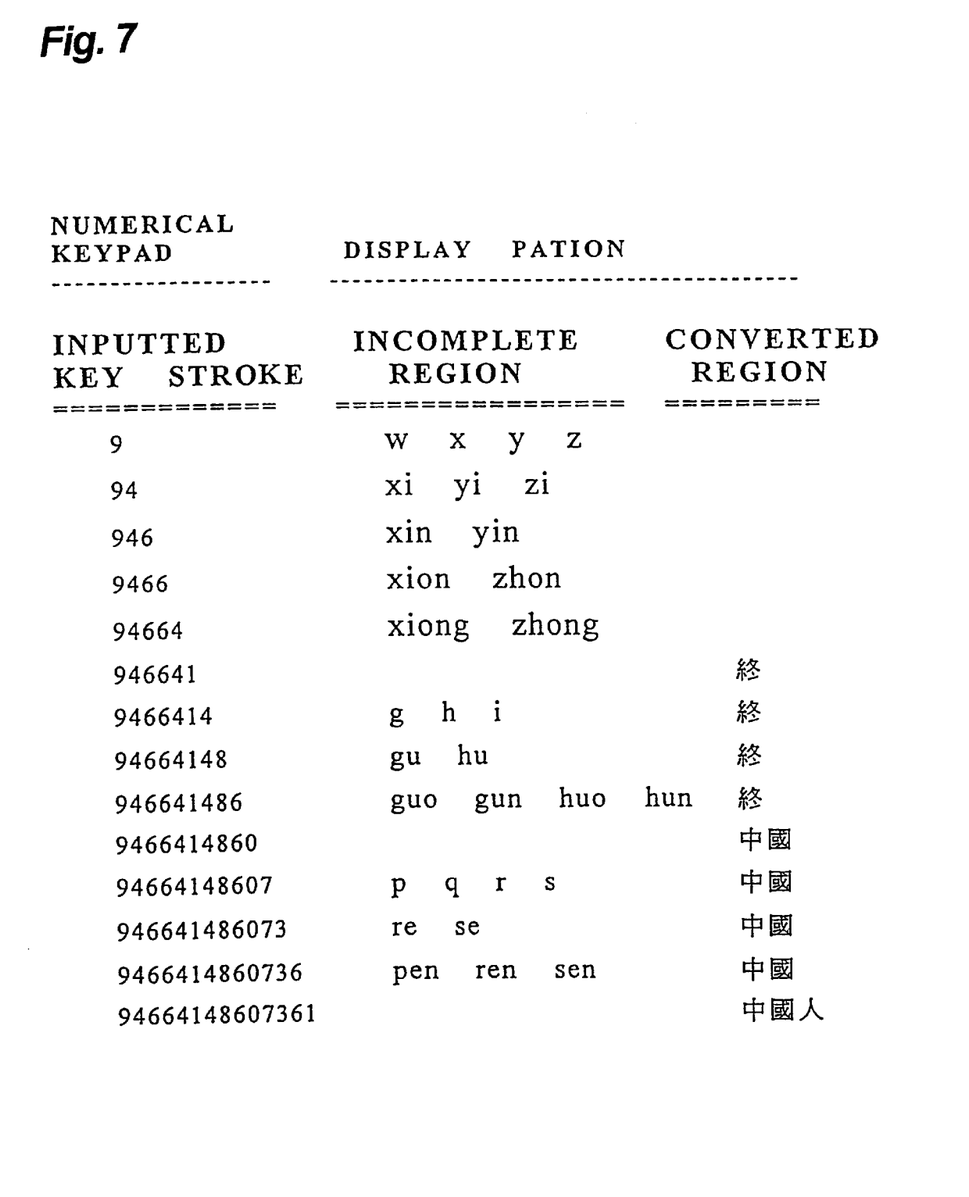
FIG. 7 illustrates an example showing the relationship among, input keys, the conversion to pinyin symbols, and the conversion to Chinese characters in the embodiment of this invention.

The processing of the embodiment of this invention is further described using the following illustrative example. FIG. 6 illustrates a table showing the relationship among the input keys, the conversion to pinyin symbols, and the conversion to Chinese characters when the user inputs the word "中國人" (the pinyin symbol combinations of which are "zhong guo ren"). As shown in the table, the display portion includes an incomplete portion and a converted portion. The incomplete portion displays the pinyin symbol combination yet to be converted into a Chinese character. The converted portion displays the converted Chinese character.

Initially, when key "9" is pressed, the incomplete portion displays the possible pinyin symbol combinations "w", "x", "y", and "z". When key "4" is subsequently pressed, the incomplete portion displays the pinyin symbol combinations "xi", "yi", and "zi" corresponding to the key signal combination "94". When the keys "9466" are inputted, the incomplete portion displays the corresponding possible pinyin symbol combinations "xion" and "zhon" for the key signal combination "9466". When the keys "94664" are inputted, the incomplete portion displays "xiong" and "zhong". A key "1" is then inputted for the desired "zhong" (to select the first one, key "0" is pressed, to select the second one, key "1" is inputted, and so on).

At the moment it is determined that the pinyin symbol combination is "zhong", the combination is converted into the Chinese character "終" which is displayed in the converted portion. After that, no pinyin symbol combination will be shown in the incomplete portion, and the input of the next character can begin. After input of "guo" has been completed, the "終" in the converted portion will change to "中國" This is done by the Chinese word converting portion, which searches for the corresponding word. From the example described above, only 14 keys are needed to input "中國人" This number is the same as that needed when input is done via a computer keyboard. On the other hand, the Romanization input method using numerical keys for inputting Chinese characters as disclosed in R.O.C. Patent Publication No. 73890 requires 19 keys.

With the invention thus explained, various modifications can be made without departing from the spirit of the present invention. For example, the arrangement of the numerical keys is not confined only to that illustrated in FIG. 4. For example, "a", "b" and "c" can be arranged on key "9", "d", "e" and "f" can be arranged on key "8", "g", "h" and "i" can be arranged on key "7", and so on. Moreover, the conversion key "0" can be replaced by key "1", "#", or "*".

I claim:

1. A Chinese pinyin input method for inputting Chinese characters or Chinese words by using a numerical keypad including number keys associated with alphabetic characters arranged in an order of a standard telephone set, the method comprising:

providing a look-up portion that stores a plurality of pinyin symbols and a corresponding strings of numbers in accordance with an association between the number keys and the alphabetic characters;

providing a dictionary that stores pinyin symbols and at least one corresponding Chinese character or Chinese word;

inputting a plurality of numbers to form a string by using the numerical keypad;

searching the plurality of strings of numbers stored in the look-up portion to find at least one string of numbers which at least partially matches the input string;

retrieving at least one pinyin symbol corresponding to the matching string of numbers;

determining whether the retrieved at least one pinyin symbol comprises a single Chinese character or Chinese word;

retrieving from the dictionary one Chinese character or Chinese word, when the determining determines that one Chinese character or Chinese word corresponds to the input string; and displaying the retrieved Chinese character or Chinese word.

2. A Chinese pinyin input apparatus for inputting Chinese characters or Chinese words by using a numerical keypad, comprising:

a numerical keypad including number keys arranged in the order of a standard telephone set with alphabetic characters associated with the keys, the numerical keypad being used to input a string of numbers;

a memory;

a look-up portion provided in a first portion of the memory, the look-up portion storing a plurality of pinyin symbol combinations and a plurality of corresponding strings of numbers in accordance with an association between the number keys and the alphabetic characters;

a dictionary provided in a second portion of the memory, the dictionary storing a plurality of pinyin symbol combinations and at least one Chinese character or Chinese word associated with each other;

a processor that searches the look-up portion to find at least one string of numbers that at least partially matches the input string, retrieves the pinyin symbol or symbols that corresponding to the string of numbers which at least partially matches the input string, and determines whether the retrieved pinyin symbol or symbols is a single pinyin symbol;

a Chinese word converter that converts the single pinyin symbol into at least one Chinese character or Chinese word by using the dictionary; and a display that displays the retrieved Chinese character or Chinese word.

* * * * *

UNITED STATES PATENT AND TRADEMARK OFFICE
CERTIFICATE OF CORRECTION

PATENT NO. : 6,765,504 B2
DATED : July 20, 2004
INVENTOR(S) : Y. Ouyang et al.

It is certified that error appears in the above-identified patent and that said Letters Patent is hereby corrected as shown below:

Column 8,
Line 21, before "corresponding" delete "a".
Line 64, "corresponding" should be -- correspond --.

Signed and Sealed this

Fourth Day of January, 2005

JON W. DUDAS
*Director of the United States Patent and Trademark Office*

UNITED STATES PATENT AND TRADEMARK OFFICE
CERTIFICATE OF CORRECTION

PATENT NO. : 6,765,504 B2
DATED : July 20, 2004
INVENTOR(S) : Y. Ouyang et al.

It is certified that error appears in the above-identified patent and that said Letters Patent is hereby corrected as shown below:

Drawings,
Sheet 8, the label "Prior Art" is missing in fig 8 and should be included.
Sheet 8, the label "Prior Art" is missing in fig 9 and should be included.

Signed and Sealed this

Twenty-first Day of June, 2005

JON W. DUDAS
*Director of the United States Patent and Trademark Office*